(12) United States Patent
Hubbard et al.

(10) Patent No.: US 11,182,722 B2
(45) Date of Patent: Nov. 23, 2021

(54) COGNITIVE SYSTEM FOR AUTOMATIC RISK ASSESSMENT, SOLUTION IDENTIFICATION, AND ACTION ENABLEMENT

(71) Applicant: International Business Machines Corporation, Armonk, NY (US)

(72) Inventors: Alex Richard Hubbard, Rensselaer, NY (US); Spyridon Skordas, Troy, NY (US); Marc A. Bergendahl, Troy, NY (US); Cody John Murray, Scotia, NY (US); Gauri Karve, Cohoes, NY (US); Lawrence A. Clevenger, Saratoga Springs, NY (US)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 16/361,530

(22) Filed: Mar. 22, 2019

(65) Prior Publication Data

US 2020/0302352 A1 Sep. 24, 2020

(51) Int. Cl.
*G06Q 10/06* (2012.01)
*G05B 15/02* (2006.01)
*G06N 20/20* (2019.01)

(52) U.S. Cl.
CPC ......... *G06Q 10/0635* (2013.01); *G05B 15/02* (2013.01); *G06N 20/20* (2019.01)

(58) Field of Classification Search
CPC ..... G06Q 10/0635; G05B 15/02; G06N 20/20
USPC ...................................................... 705/7.28
See application file for complete search history.

(56) References Cited

U.S. PATENT DOCUMENTS

| | | | |
|---|---|---|---|
| 7,386,751 B2* | 6/2008 | Cheng | G06Q 10/0631 714/1 |
| 8,218,738 B2* | 7/2012 | Diethorn | H04L 12/2827 379/102.05 |
| 8,560,889 B2* | 10/2013 | Behrendt | G06F 11/203 714/15 |
| 8,720,791 B2 | 5/2014 | Slingsby et al. | |
| 10,045,187 B1 | 8/2018 | Soleimani | |
| 10,070,392 B1* | 9/2018 | Singhal | H04W 4/025 |

(Continued)

FOREIGN PATENT DOCUMENTS

| | | |
|---|---|---|
| WO | 2005/008914 A1 | 1/2005 |
| WO | 2016073403 A1 | 5/2016 |

OTHER PUBLICATIONS

F.D. Petit et al., "Protective Measures Index and Vulnerability Index: Indicators of Critcal Infrastructure Protection and Vulnerability," Argonne National Laboratory, Jul. 2013, 72 pages.

*Primary Examiner* — Romain Jeanty
(74) *Attorney, Agent, or Firm* — Randall Bluestone; Ryan, Mason & Lewis, LLP

(57) ABSTRACT

A method includes monitoring with at least one monitoring tool one or more activities associated with an enterprise. The method further includes analyzing data input from the at least one monitoring tool of the one or more activities, and determining, based on analytics performed on the data input and an implemented policy, when the one or more activities qualifies as an incident. A remedial response responsive to the incident is initiated. The monitoring, analyzing, determining and initiating steps are performed by at least one processing device including a processor operatively coupled to a memory.

20 Claims, 9 Drawing Sheets

(56) References Cited

U.S. PATENT DOCUMENTS

| | | |
|---|---|---|
| 2005/0035854 A1 | 2/2005 | Gupta et al. |
| 2005/0043907 A1 | 2/2005 | Eckel et al. |
| 2005/0101250 A1 | 5/2005 | Helal et al. |
| 2006/0064486 A1* | 3/2006 | Baron .................. H04L 41/5019 709/224 |
| 2011/0126111 A1 | 5/2011 | Gill et al. |
| 2011/0238430 A1* | 9/2011 | Sikorski .................. G06Q 10/10 705/1.1 |
| 2012/0001755 A1 | 1/2012 | Conrady |
| 2013/0179938 A1* | 7/2013 | Choi ...................... G06Q 10/04 726/1 |
| 2016/0014587 A1* | 1/2016 | Hines ...................... H04L 12/66 455/404.2 |
| 2017/0146986 A1 | 5/2017 | Libal et al. |

* cited by examiner

COGNITIVE SYSTEM FOR AUTOMATIC RISK ASSESSMENT, SOLUTION IDENTIFICATION, AND ACTION ENABLEMENT

BACKGROUND

Incident management is a process or protocol in which an enterprise deals with a potentially destructive event occurring within the enterprise. The event may include, but is not limited to, water leakage or flooding, gas leaks, smoke or fire, unauthorized access, utility usage, sensor malfunction or any other destructive event which may occur within a building or residence associated with the enterprise. The response to the event is generally controlled by the owner of the residence or a representative, for example, an individual or personnel, associated with the enterprise, and is typically effected through directed communication of the owner or representative with emergency service personnel.

SUMMARY

The present application generally relates to incident management, and more particularly, relates to a cognitive-based system embodied in a computing environment capable of identifying the occurrence of an incident at an enterprise, and automatically initiating one or more remedial responses to address the incident based on an implemented policy.

In one illustrative embodiment of the present invention, a method includes monitoring, with at least one monitoring tool, one or more activities associated with an enterprise. The method further includes analyzing data input from the at least one monitoring tool of the one or more activities. The method further includes determining, based on analytics performed on the data input and an implemented policy, when the one or more activities qualifies as an incident, and initiating a remedial response responsive to the incident. The monitoring, analyzing, determining and initiating steps are performed by at least one processing device comprising a processor operatively coupled to a memory.

In another illustrative embodiment of the present invention, a system includes memory, at least one processor coupled to the memory. The at least one processor is configured to monitor with at least one monitoring tool one or more activities associated with an enterprise. The at least one processor is further configured to analyze data input from the at least one monitoring tool of the one or more activities, and determine, based on analytics performed on the data input and an implemented policy, when the one or more activities qualifies as an incident. The at least one processor will generate a remedial response responsive to the incident.

In another illustrative embodiment of the present invention, a computer program product includes a non-transitory computer readable medium encoded with computer executable code. The code is configured to monitor with at least one monitoring tool one or more activities associated with an enterprise. The code if further configured to analyze data input from the at least one monitoring tool of the one or more activities, and determine, based on analytics performed on the data input and an implemented policy, when the one or more activities qualifies as an incident. The code will initiate a remedial response responsive to the incident.

Other embodiments will be described in the following detailed description of embodiments, which is to be read in conjunction with the accompanying figures.

DETAILED DESCRIPTION

Figure 1:
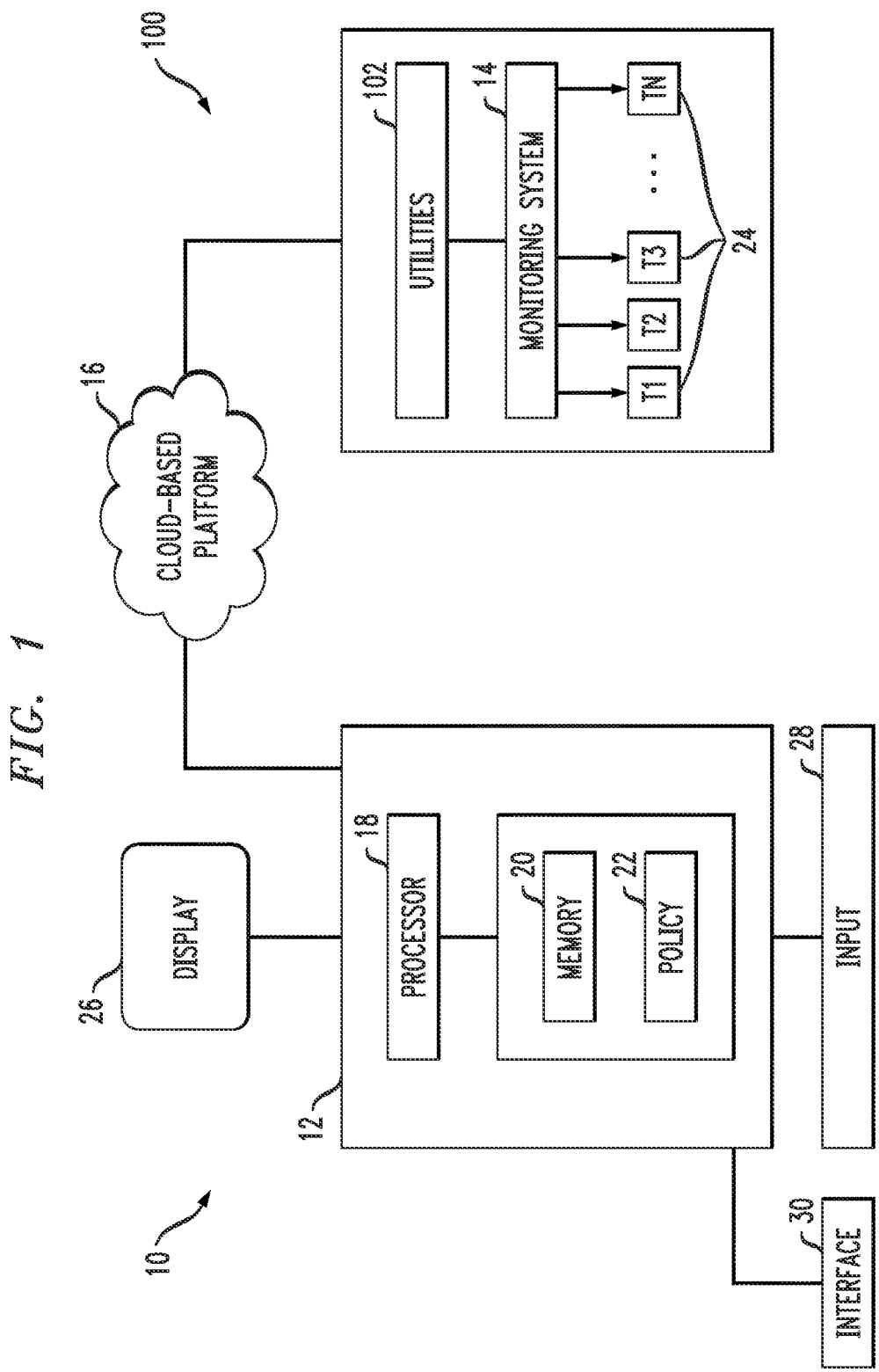
FIG. 1 illustrates an architecture of a cognitive-based system for identifying an incident at an enterprise and initiating a remedial response to the incident.

Embodiments of the present invention provide a cognitive-based method, system and computer program product for detecting the occurrence of an incident at an enterprise, and automatically controlling the type and extent of the response to the incident based on a plurality of historical or current parameters input into a computing environment monitoring the enterprise. The response may be effected even in the absence of a representative of the enterprise who may or may not have any knowledge the incident occurred.

According to some embodiments of the present invention, there is provided a cognitive-based monitoring system and one or more methods for detecting an incident at an enterprise. The cognitive-based monitoring system includes the use of monitoring tools and sensors such as water leak sensors, acoustic sensors, fluid flow sensors, thermal sensors, gas sensors, odor sensors, smoke sensors or the like. Other monitoring tools include alarms (e.g., intruder alarms), video cameras and streaming, gauges such as gas meters, water meters, electric meters, etc. Upon detection of an incident via the data gathered by the monitoring took, the cognitive-based monitoring system will, in accordance with an established implemented policy, automatically generate a remedial response to the incident.

In the text which follows, the term "incident" includes any event which occurs within the enterprise, which is inconsistent with the normal operations and processes of the enterprise. The term "remedial response" includes any action taken on behalf of the system to the incident, in accordance with the policy, and can include remaining idle for a set period of time.

Illustrative embodiments may also obtain and evaluate historical data tracking historical usage of various utilities including electric, gas, fuel and water usage, and compare the historical data against current data collected by the meters to identify usage beyond a threshold. Usage beyond a threshold, including over-usage or under-usage, may be indicative of the occurrence of an incident at the enterprise.

In accordance with the implemented policy, the degree or extent of the response to the incident is based on a variety of parameters. The parameters are inclusive, but not limited to, potential cost of the proposed response, available resources including personnel and equipment, and projection of damage of the incident if the remedial response is to remain idle. Other parameters may include prioritization in the occurrence of multiple incidents, presence of occupants at the enterprise, structure-type, etc.

Illustrative embodiments also include determining whether to immediately notify the representative of the enterprise of the occurrence of the incident based on a location of the representative relative to the location of the enterprise. For example, it is contemplated that if the representative is within a predetermined distance from the enterprise, the representative will be directly notified of the incident. However, if the representative is located at a distance which exceeds the predetermined distance, the cognitive-based monitoring system will automatically implement an action plan in response to the incident without the representative's prior knowledge and/or approval. It is contemplated that the representative will be subsequently notified, but the remedial response is still implemented.

Contemplated remedial responses include contacting emergency personnel such as police, fire and medical professionals and/or contacting contracting professionals such as plumbers, electricians, construction contractors, etc. In addition, insurance carriers may be contacted to initiate the commencement of an insurance claim. As mentioned above, a remedial response also may be to remain idle at least initially, and not implement any immediate plan in response to the incident.

Illustrative embodiments overcome issues with conventional incident detection systems which are generally limited to sensing smoke, fire or unauthorized access to the premises of an enterprise. Moreover, conventional systems do not consider implementing a response inclusive of one or more tasks involving multiple activities and personnel. Conventional response systems also do not contemplate the potential cost of implementing certain responses to the disrupting incident, and lack the ability to prioritize action options based on cost or other available resources or considerations. Even further, conventional systems do not incorporate historical data such as water, electricity, gas or oil usage to at least partially assist in identifying the occurrence of an incident. In addition, conventional systems fail to track the location of a representative of the enterprise or premises to inform the representative of the incident or to make a determination to implement a remedial response in the event the representative is remote from the enterprise. In general, conventional systems are devoid of a cognitive-based monitoring system capable of detecting a multitude of incidents, and employing a remedial response(s) to the incident in accordance with an implemented policy.

Referring now to FIG. 1, there is illustrated one embodiment of the cognitive-based monitoring system 10 for identifying an incident at an enterprise 100 and initiating a remedial response according to an implemented policy. The system 10 monitors an enterprise 100 which may be any structure including, but not limited to a factory or plant, a refinery, a commercial building, an apartment, a residential home, a retail building, a stadium or any other facility. In the alternative, the enterprise 100 may be an outdoor facility, park, or recreational area. The enterprise 100 incorporates utilities 102 such as plumbing, heating, air conditioning, electric, sprinkler systems, etc., and any auxiliary equipment which support the utilities and operation of the enterprise. In general, the enterprise 100 includes all buildings and properties associated with the enterprise 100.

The system 10 includes one or more computing devices 12 and a monitoring system 14 which is located at least in part within or adjacent the enterprise 100. The monitoring system 14 is in communication with the computing device 12 through a wired or wireless connection. In illustrative embodiments, the computing device 12 and the monitoring system 14 communicate through a cloud-based platform 16. The cloud-based platform 16 may include a public or private cloud or a hybrid of public and private cloud platforms. The computing device 12 may be a desktop computer, a laptop computer, a smartphone or tablet device or any other Internet of Things (IoT) device. The computing device 12 includes a processor 18 and a memory 20 coupled to the processor 18. The memory 20 may be any type of storage medium accessible by the processor 18 to perform the functions and operations of the system 10. The memory 20 includes computer code, logic or software adapted to perform analytics on data received from the enterprise 100 and to perform the operations of the implemented policy 22 of the system 10.

The monitoring system 14 includes a plurality of monitoring tools 24 including, but not limited to, alarms, sensors, cameras, detectors etc. Further examples of monitoring tools 24 include water leak sensors, humidity sensors, acoustic sensors, flow (e.g., water or liquid) sensors, odor sensors, pressure sensors, gas sensors and thermal sensors. These monitoring tools 24 may be installed on the premises of the enterprise 100 or adjacent the premises. Some of the monitoring tools 24 may be directly coupled to the utilities 102 of the enterprise 100. In this regard, the monitoring tools 24 may monitor, for example, water usage, gas usage, electricity usage, oil usage of the enterprise, and may be in the form of gauges. It is further envisioned that the monitoring tools 24 may be wearable, e.g., on a human, on watch dogs, or mounted on an unmanned computer operated vehicle, etc., and thus are mobile. The monitoring took or sensors 24 are wireless having the capability of receiving and transmitting data to and from the cloud-based platform 16 and the computing device 12 through a network interface. Many autonomous sensors for detecting physical or environmental conditions are commercially available. In exemplary embodiments, the monitoring tools or sensors 24 may comprise a wireless sensor network incorporating nodes in communication with the computing device 12.

The computing device 12 further includes a video display 26. The display 26 may be a screen mounted to the computing device 12 or be external to the computing device 12. The display 26 will display data associated with the enterprise 100 and/or associated with the incident. The display 26 may be incorporated within the computing device 12, for example, when the computing device 12 includes a mobile phone, tablet, personal digital assistant (PDA), etc. More than one display 26 is also envisioned. The computing device 12 further includes an input 28 such as a keyboard, mouse, and/or a voice input. Alternatively, the input 28 may be incorporated on the display 26, for example, as a touch screen system. The computing device 12 further includes an interface 30 (e.g., wireless or electrical/mechanical connection such as a USB port or a CD-ROM) to permit import of program instructions to change, modify or alter the implemented policy 22 of the system 10 in accordance with embodiments of the present invention.

The computing device 12 and the enterprise 100 are shown as being separate and apart from each other. However, it is envisioned that the computing device 12 can be located in the enterprise 100 and/or incorporate a portion of the enterprise 100. In addition, although a single computing device 12 and enterprise 100 are shown, illustrative embodiments are not limited to a particular number of computing devices 12 and/or or enterprises 100. For example, the computing device 12 can manage a plurality of enterprises 100. In this capacity, the computing device 12 may be a component of several cognitive-based systems monitoring a plurality of enterprises 100.

The policy 22 of the system may be implemented via various program codes, logic, algorithms, etc. associated with the memory 20 of the computing device 12. The algorithms may be supervised, semi-supervised or unsupervised algorithms machine learning algorithms. Examples of suitable machine learning algorithms include linear regression, logistic regression, Naive Bayes, etc. The program code of the implemented policy 22 considers many factors relevant to the enterprise 100. These factors include, but are not limited to, building premises, structure, location, surrounding environment, utilities, mechanical and electrical systems, safety systems including the presence of detectors and sensors, alarms, security systems, frequency of occurrence of incidents and incident types, location of emergency service personnel including fire, police and medical professionals, insurance on the premises, presence of occupants, location of the representative of the enterprise 100, wireless control capabilities, etc. The policy 22 may be continually modified via the input 28 or the interface 30 of the computing device 12, and/or through machine learning capabilities discussed hereinabove.

Figure 2:
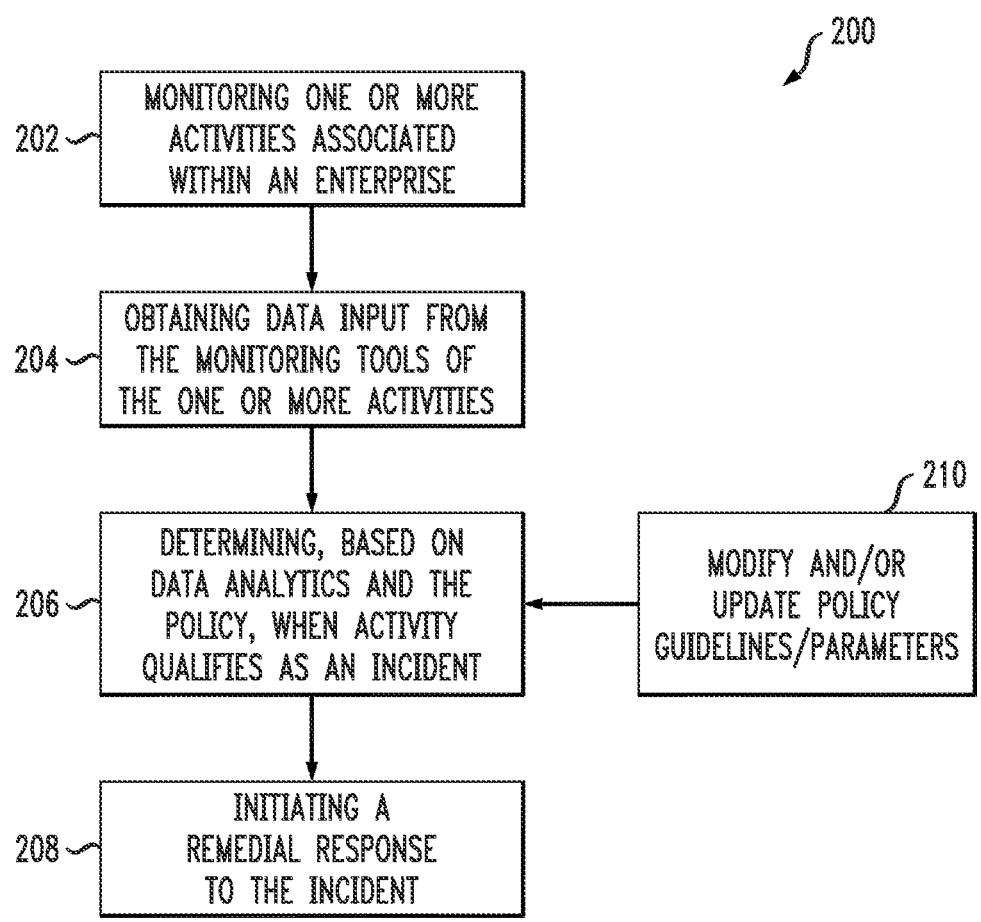
FIG. 2 is a flow chart of an exemplary methodology for identifying the incident and initiating the remedial response according to one or more embodiments of the present invention.

FIG. 2 is a flow chart of an exemplary methodology of use of the system 10. The method 200 includes monitoring at the enterprise 100 one or more activities with the monitoring tools 24. (STEP 202). As noted above, various activities of the enterprise 100 may be monitored including water usage, gas usage, electric usage, etc. In addition, the various sensors of the monitoring tools 24 are also activated to sense the environmental or physical conditions within, or at, the enterprise including temperature, presence of gas, odor, acoustics, etc. The data from the monitoring tools 24 is obtained by the computing device 12 via the wireless network and the cloud. (STEP 204).

In STEP 206, the computing device 12 analyzes the data via the data analytic software associated with the processor 18 and the memory 20, and makes a determination consistent with the implemented policy 22, as to whether the detected activity qualifies as an incident. In general, the detection of smoke or carbon monoxide would automatically initiate a remedial response to contact emergency service personnel including fire and police. On the other hand, if any of the other sensors of the monitoring tools 24, for example, acoustic, thermal, gas, odor, fluid flow, etc. or video streaming, detect the presence of an irregular environmental condition within the enterprise 100, the computing device 12 will make a determination in accordance with the implemented policy 22 whether the event qualifies as an incident and warrants an immediate remedial response or a delayed remedial response. If the event does qualify, a remedial response will be initiated. (STEP 208). The types of remedial responses and the criteria considered in initiating the responses are based on the implemented policy 22, and will be discussed in further detail hereinbelow.

FIG. 2 also illustrates that the implemented policy 22 is continually updated with new or modified data (STEP 210), which data is considered in STEP 206 when making a determination if the event or activity qualifies as an incident. Updating in accordance with STEP 210 may be a result of output of machine learning algorithms associated with the logic and memory 20 of the computing device 12 and/or various other parameters which may be manually entered into the system via the input 28 or interface 30.

Figure 3:
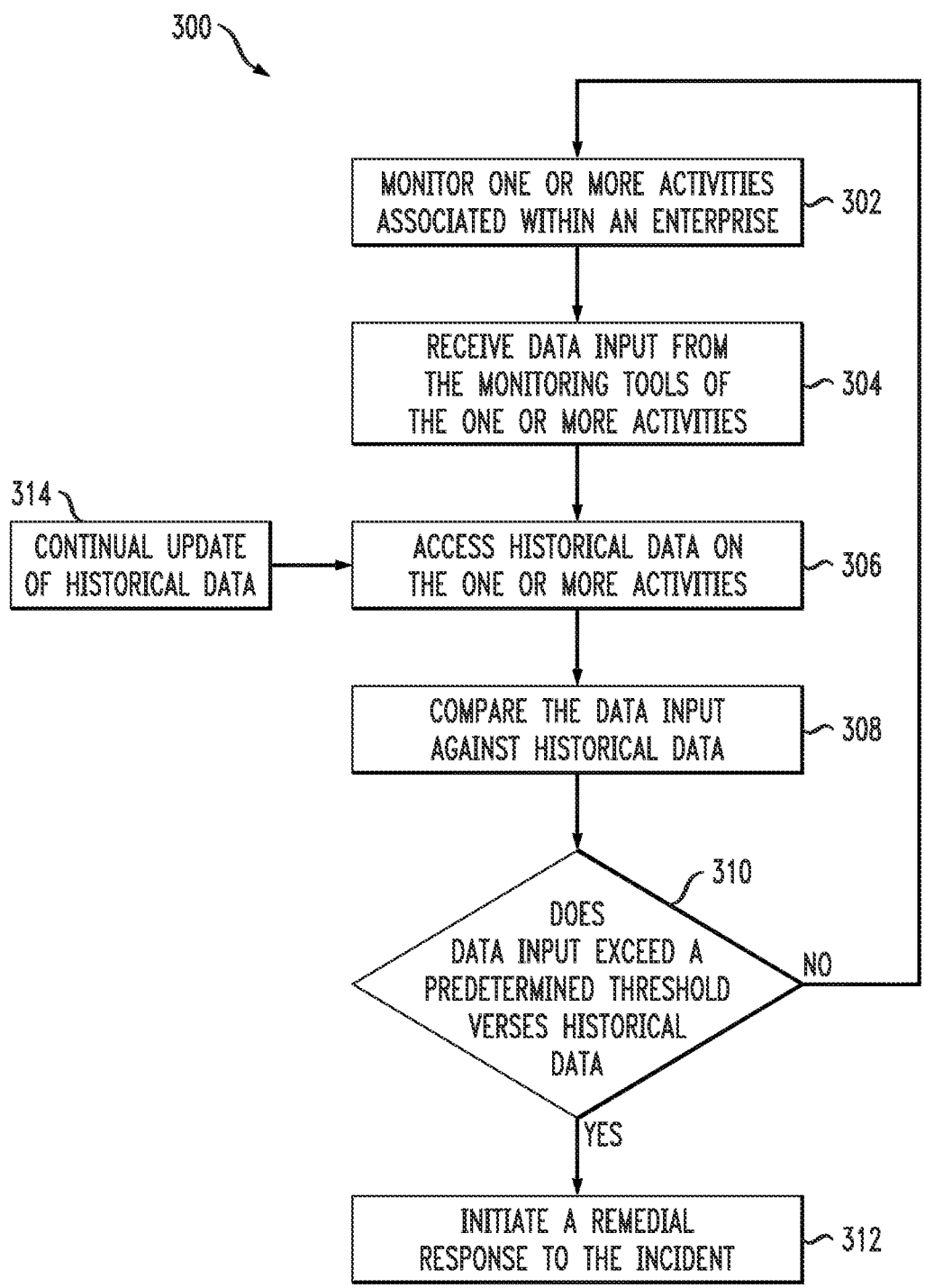
FIG. 3 is a flow chart of an exemplary methodology for identifying the incident based on historical data and initiating the remedial response according to one or more embodiments of the present invention.

Referring now to the low chart of FIG. 3, another exemplary methodology 300 of implementing the system 10 is illustrated. In accordance with this methodology, historical data of the enterprise 100 is input into the computing device 12 and utilized in determining whether an event qualifies as an incident. For example, historical data pertaining to usage or consumption by the enterprise of the various utilities, i.e., electrical consumption, gas or fuel consumption, water consumption, etc. for specified time periods including, for example, hourly, daily, weekly, monthly or seasonal consumption is entered into the computing device 12 and compared against current usage. The historical data may be utilized to calculate an average or mean consumption as a function of time via the data analytics capabilities in the processor 18 and the memory 20. If the current usage exceeds a predefined threshold above or below the average or mean for a specific time period, then the probability of the occurrence of an incident is increased.

With continued reference to FIG. 3, the enterprise 100 is continually monitored with the monitoring tools 24 as described hereinabove (STEP 302), and data input from the monitoring tools 24 is received by the computing device 12. (STEP 304). The historical data is accessed via the program code within the memory 20. (STEP 306). The current utility consumption is compared against the historical data (STEP 308), and if it exceeds a predefined threshold (STEP 310), for example, below or above the average consumption for that specific time period, the computing device will initiate a remedial response (STEP 312) otherwise the methodology returns to STEP 302. As an example, excessive use of water above a threshold level as determined by a water meter incorporated as a monitoring tool 24 may indicate a water leak. Excessive use of gas as determined by a gas meter as a monitoring tool 24 above a threshold may indicate a gas leak, or, on the other hand, under-utilization of gas below a threshold may indicate a mechanical system such as a heating system is not operating. If the current usage is consistent with historical usage, the monitoring system 14 will be continually utilized to monitor the conditions of the enterprise and no action will be taken. The historical data is continually updated in the memory of the computing device 12 to ensure the accuracy of the data. (STEP 314).

Thus, qualifying an activity or activities as an incident considers various factors including detection of a significant change in the environmental condition based on data received by one of the environmental sensors and/or comparing the input data against historical data. As appreciated upon a determination of the incident, the remedial response (whatever form it may take) is automatically initiated by the system 10.

Figure 4:
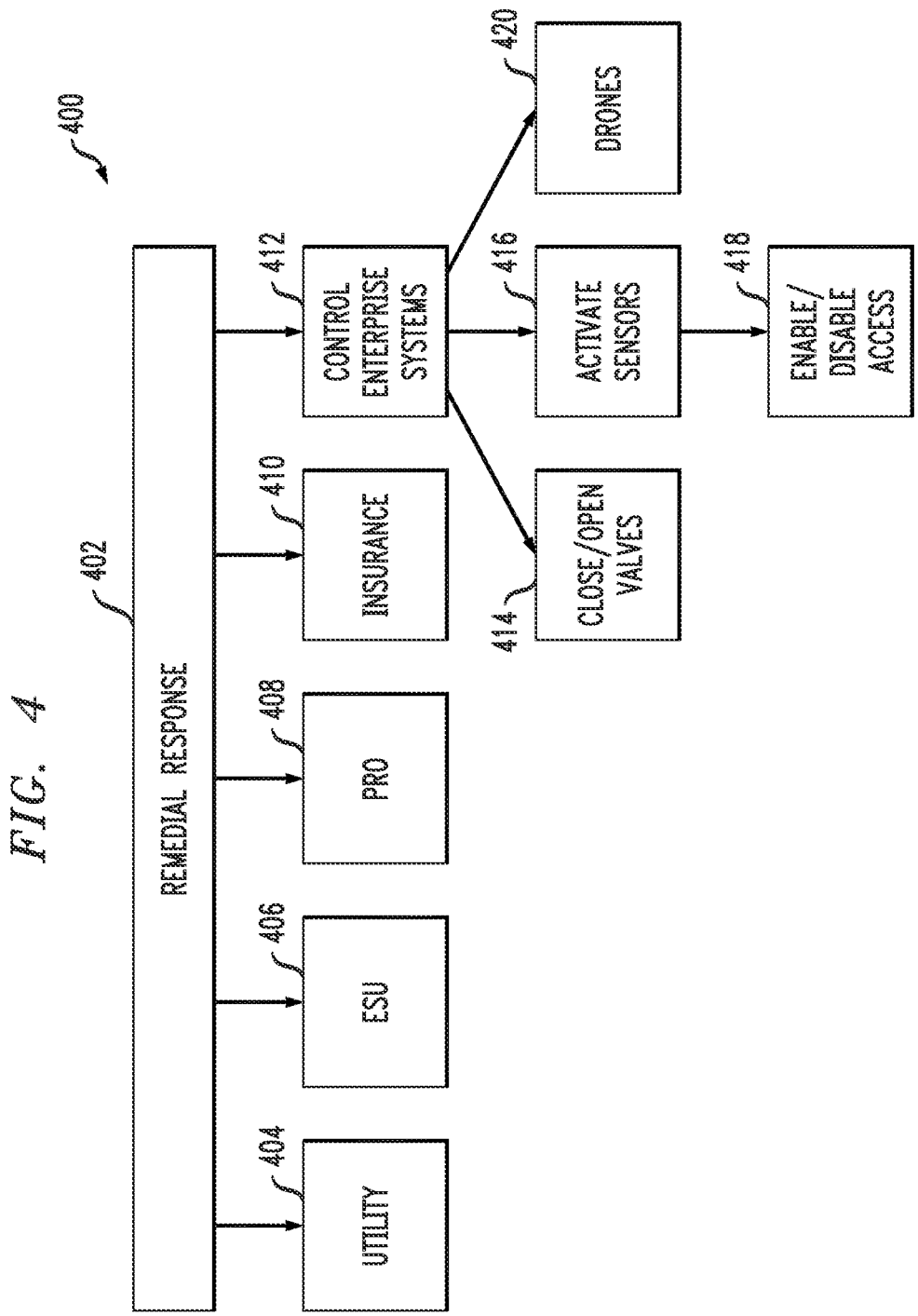
FIG. 4 illustrates another exemplary methodology for implementing the remedial response in response to the incident according to one or more embodiments of the present invention.

Referring now to the chart of FIG. 4, various exemplative remedial responses 400 to be initiated by the computing device 12 of the system 10 in accordance with the implemented policy 22 will be discussed. The remedial responses presented in FIG. 4 are examples only and are listed to better appreciate the capabilities of the system 10. It is envisioned that different remedial responses and/or additional remedial responses may be undertaken depending on the incident and the situation of the involved enterprise 10. The implemented policy 22 also considers the monetary expense of potential remedial responses to the incident as a factor in choosing the remedial response.

In one illustrative embodiment, the monitoring tools 24 detect an issue warranting a remedial response. The remedial response selected is in accordance with the implemented policy 22 and consider the aforementioned factors and parameters including potential cost of the incident and expense of the proposed remedial response. (BLOCK 402). For example, a potential gas or water leak is detected via, for example, readings on the respective gas and water gauges exceeding a predefined threshold in accordance with the policy. In the alternative, or in combination therewith, the monitoring tools 24 such as a gas sensor, odor sensor, flow sensor, and video streaming may confirm the occurrence of an incident, i.e., the gas or water leak. Upon determination of the leak as an incident utilizing the methodologies of FIG. 2 and/or FIG. 3, the appropriate utility company (BLOCK 404) is automatically contacted by the system 10 to be dispatched to shut off the gas or water main to the enterprise 100. In the alternative, the system 10 may have the capability to close the main gas or water valve remotely via wireless transmission, and proceeds to close the appropriate gas or water main on its own. It is also contemplated that, at least in the presence of a gas leak, emergency service personnel including fire and police are contacted.

In another illustrative embodiment, the monitoring tools 24 detect the presence of smoke via the smoke or carbon monoxide sensors, or alternatively detect heat via the thermal sensors. The detection of heat or smoke will cause the system to automatically contact emergency service personnel (ESU)) such as fire, police and potentially medical personnel for dispatch to the enterprise 100. (BLOCK 406). It is also envisioned that emergency service personnel would be contacted in the event motions sensors or video streaming indicates unauthorized trespass by a third party.

In certain situations, the remedial response may involve contacting a PRO (BLOCK 408), e.g., a professional contractor such as a building contractor, plumber, HVAC service personnel, electrician, computer technicians etc. The decision by the system to initiate contact with the PRO may be concurrent with contacting the utility company or emergency service personnel, or may be subsequent thereto. For example, in the event of a flood or fire, the system may wait a predetermined time period to contact the PRO to address any repairs needed to return the enterprise to its initial status, or at least operational. The predetermined period of time may be dependent upon the type or nature of incident. Issues with plumbing or HVAC may require a shorter predetermined period of time than, e.g., construction activities.

The system 10 may also contact an insurance company insuring the enterprise (BLOCK 410), including flood, casualty, automobile, building insurance carriers, etc. It is envisioned that the insurance company would be contacted within a defined time period after the incident, for example, within a day. As a further feature, the system may initiate the filing of an insurance claim associated with the incident. The system 10 may populate the insurance form with data relating to the premises of the enterprise, nature of the claim and any other information necessary to generate or fill a claim form to commence the claim process.

With continued reference to FIG. 4, the system 10 further may be adapted to activate/deactivate control systems associated with the enterprise 10 upon the occurrence of an incident. (BLOCK 412). For example, upon detection of a water leak or a gas leak via one of the aforementioned monitoring tools 24, the system 10 may remotely close and/or open various main or in-line valves associated with water, irrigation, fuel or gas systems. (BLOCK 414). Electrical systems may be shut off in part or in whole at the enterprise 100.

At BLOCK 416, various sensors also may be activated upon occurrence of the incident. Such sensors may be inclusive of additional gas, water, acoustic, smoke, infrared, thermal, video, etc. The activation of these sensors may enable the representative to monitor areas of the enterprise premises also adjacent to the location of the incident. The system 10 may receive feedback from the sensors to determine if the incident has migrated to other areas of the enterprise premises or that an additional incident emanating from the original event has occurred. In addition, the system 10 may enable or disable access via wireless transmission to certain areas of the premises of the enterprise 100. (BLOCK 418). For example, areas of the premises may be isolated by closing doors or partitions to prevent or at least minimize damage to areas adjacent the location of the incident.

At BLOCK 420, the system may deploy one or more drones equipped with any of the aforementioned sensors or with one or more cameras. The one or more drones can provide valuable information concerning the respective status of the incident and/or the integrity of the premises of the enterprise 100. Moreover, the drones may access areas inaccessible to emergency service personnel and/or potentially access areas not equipped with monitoring tools 24, but which may be exposed due to the nature of the event.

Figure 5:
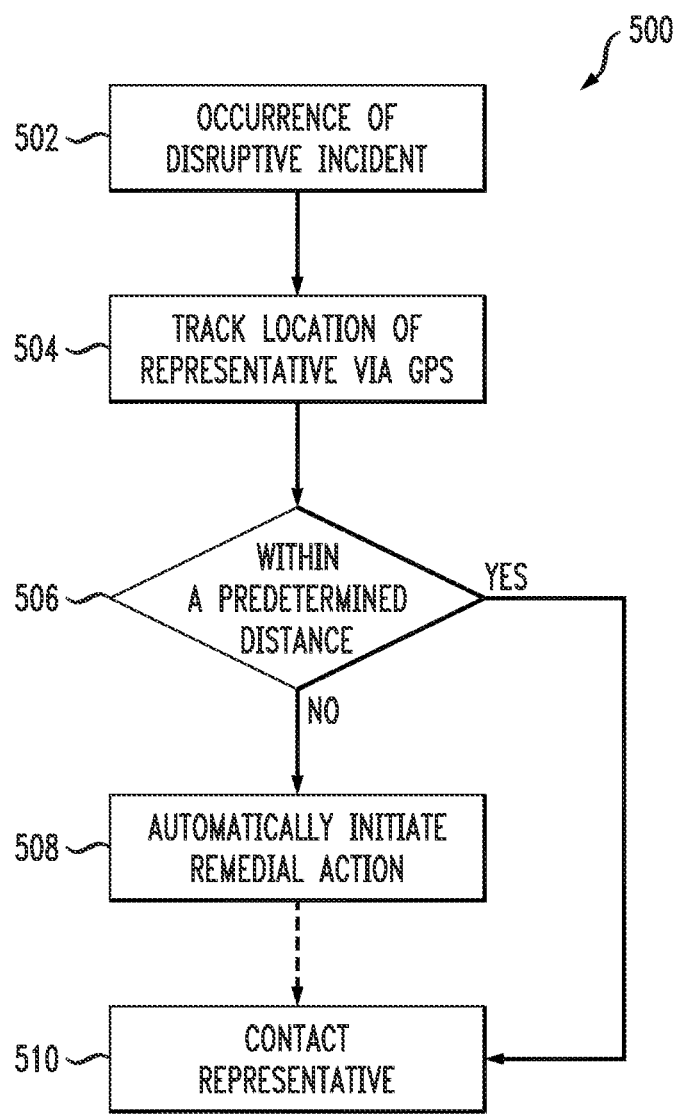
FIG. 5 is a flow chart illustrating, an exemplary methodology for initiating the remedial response based on the location of a representative of the enterprise according to one or more embodiments of the present invention.

Referring now to FIG. 5, another exemplative aspect of the system 10 includes a methodology 500 to determine the location of a representative of the enterprise upon the occurrence of the incident. A representative of an enterprise may be, for example, the owner of the enterprise or residence, maintenance personnel, or anyone assigned by the enterprise to be contacted upon occurrence of an incident. In one example, an incident occurs (STEP 502) whereby the system 10 attempts to track the current location of the representative via a global positioning system (GPS). (STEP 504). The GPS may be embodied in the IoT device of the representative. The IoT device may be a smartphone, PDA, tablet, portable computer or the like carried or in close proximity to the representative. As noted hereinabove, attempts to track the location of the enterprise constitutes a remedial response of the system 10. If it is determined by the system 10 and the representative's IOT device that the location of the representative is beyond a predefined distance in accordance with the policy (STEP 506), the computing device 12 will automatically initiate an appropriate remedial response without attempting to contact the representative. (STEP 508). Moreover, due to the remoteness of the representative relative to the enterprise 100, the ability of the representative to remedy the incident may be limited. It is envisioned that the representative would be eventually notified. If the representative is within the predefined distance, the representative will be contacted. (STEP 510). In certain situations, and depending on the type and severity of the incident and the implemented policy, the system 10 may automatically and/or simultaneously commence the subsequent remedial response along with contacting the representative (shown in phantom).

Figure 6:
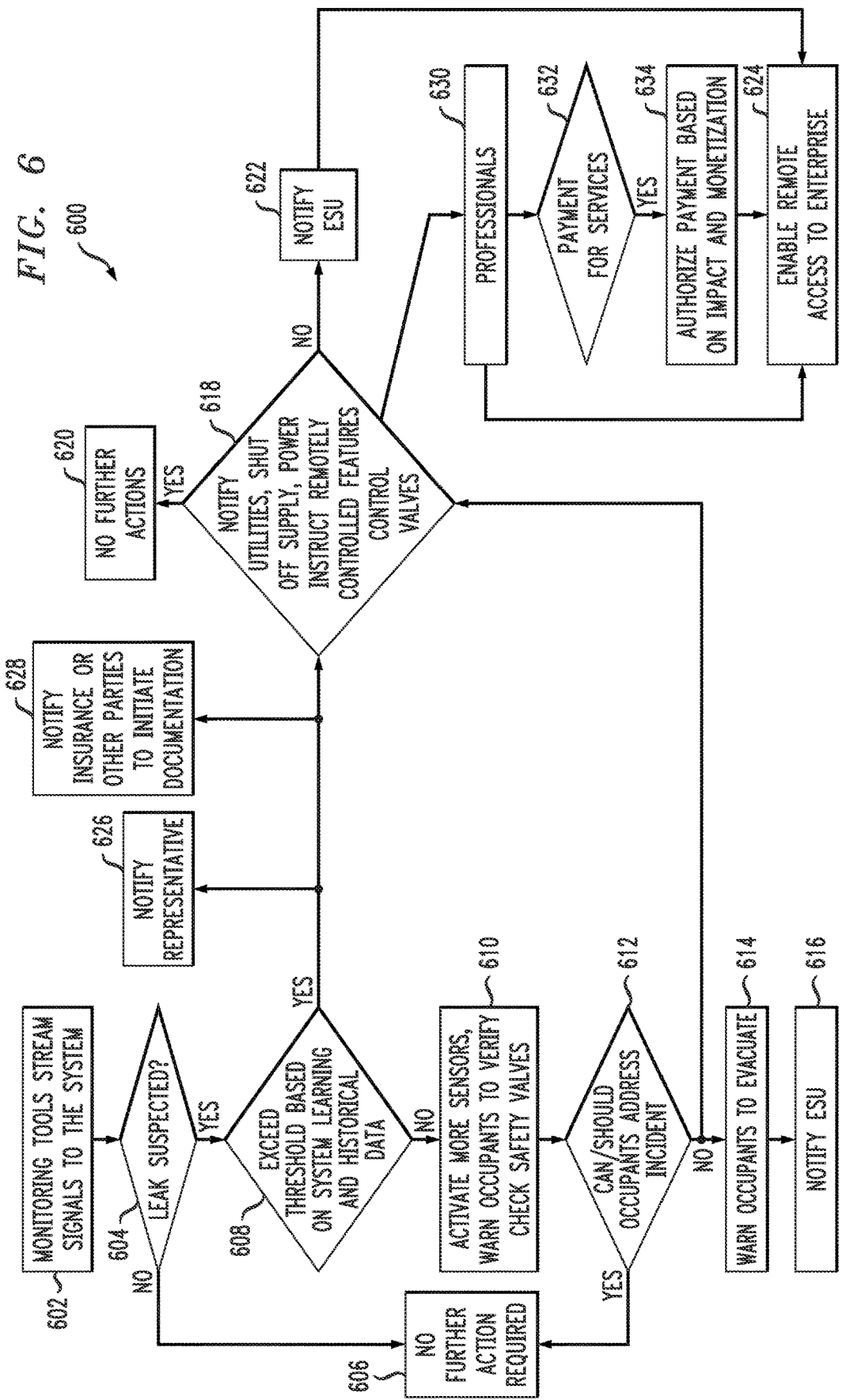
FIG. 6 illustrates an exemplary methodology for detecting a gas or water leak and initiating the remedial response according to one or more embodiments of the present invention.

Referring now to FIG. 6, there is illustrated an exemplative embodiment 600 depicting the use of the system 10 in accordance with the implemented policy 22 in addressing a leak such as a water leak or gas leak at the enterprise 100.

The enterprise 100 is monitored using the monitoring tools 24. (BLOCK 602). If the enterprise 100 is operating in its normal capacity and no concerning events are present, for example, no leak is suspected (BLOCK 604), no action is required. (BLOCK 606). However, if the monitoring tools 24 detect that a leak for example, a water or gas leak, may be suspected, via one of the gas sensors, flow sensors, gauges etc., the system takes action. At BLOCK 608, the system 10 analyzes the data transmitted by the monitoring tools 24, compares the data to historical data stored in the memory 20 of the computing device 12 and/or considers the extent of the leak based on the data from the monitoring tools 24. If it is determined that the leak is below a predetermined threshold, additional sensors within the enterprise may be activated and occupants within the enterprise, if any, will be contacted to continue monitoring the event. (BLOCK 610). In the event of a minor leak, a determination whether the occupants within the enterprise can address the leak is determined. If the occupants confirm the ability to address the event, the occupants will remedy the situation (BLOCK 612) and no further action is required. (BLOCK 606). If the occupants cannot remedy the leak, the occupants are instructed to evacuate the enterprise (BLOCK 614) and emergency service personnel including fire and police are automatically notified. (BLOCK 616).

Returning to BLOCK 608, if there is a clear determination that a leak has occurred qualifying as an incident, either via affirmative determination of the monitoring tools 24 and/or upon a comparison to historical data, and considering the potential impact of the incident as significant based on the implemented policy, the system 10 automatically contacts the appropriate utility company which is deployed to the enterprise to take remedial actions including closing the gas or water main valve. (BLOCK 618). Alternatively, or additionally, certain valves including the gas and water mains may be remotely controlled by the system 10 via wireless transmission to be closed. If the utility appropriately addresses the leak, no further action is required. (BLOCK 620). However, if the utility company cannot properly address the incident, emergency service personnel may be contacted including police, fire and/or medical personnel for dispatch to the enterprise. (BLOCK 622). Remote access to the enterprise may be facilitated by the system 10 via wireless transmission to unlock gates, doors, etc. (BLOCK 624).

Referring again back to BLOCK 608, upon determination of an incident, e.g., a gas or water leak, the representative of the enterprise 100 may be notified in accordance with the implemented policy 22 and emergency protocol discussed hereinabove. (BLOCK 626). In certain instances, depending on the nature of the incident and the location of the representative, the representative may decide that the activity associated with BLOCK 618 is not necessary and the representative will assume control in generating the remedial response, if any. Alternatively, the representative may be notified upon the occurrence of the incident, but the activities associated with BLOCK 618 will still be initiated.

As one further alternative, an insurance company or representatives thereof may be notified to at least begin preparation of a claim for potential damages caused by the leak including the generation of various forms, reports or like. (BLOCK 628).

At BLOCK 630, service personnel including plumbers, contractors, electricians, etc. may be automatically contacted, for example, after a predetermined time period subsequent to the incident, to assess the damages at the premises of the enterprise 100, for example, damages from a water leak. In one aspect, the system 10 may automatically enable access via remote wireless capabilities to the premises. (BLOCK 624). The system 10 may further authorize payment for the work to be performed by the professional to repair the premises. (BLOCK 632). Such payment may be determined manually or automatically in accordance with the policy of the system 10. The payments may be based in part on impact of the incident, insurance, liability, skill level etc. (BLOCK 634).

In accordance with other illustrative embodiments, and as discussed hereinabove, the system 10 may be adapted to consider an overall expense of the incident based on the type or nature of the incident, and generate its remedial response based at least in part of the projected expense of the remedial action. For example, if a water leak is detected by one of the monitoring tools, for example, a flow meter, video or the like, and the water damage can be maintained by shutting down a valve via the system's operating components, the system 10 may decide to remotely shut down the valve and forego contacting utility personnel and/or professional contractors, until a later period until such time the damage may be evaluated. This may minimize cost concerning overtime, emergency calls, etc.

Thus, the system 10 is capable of identifying potential events, qualify the events as incidents and automatically initiate a remedial response to the incident in accordance with the implement policy. The remedial responses may range from no action to contacting utilities, emergency service personnel, professional contractors etc.

Embodiments of the present invention include a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more program code languages, including an object oriented program code language such as Python, C++, or the like, and procedural program code languages, such as the "C" program code language or similar program code languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
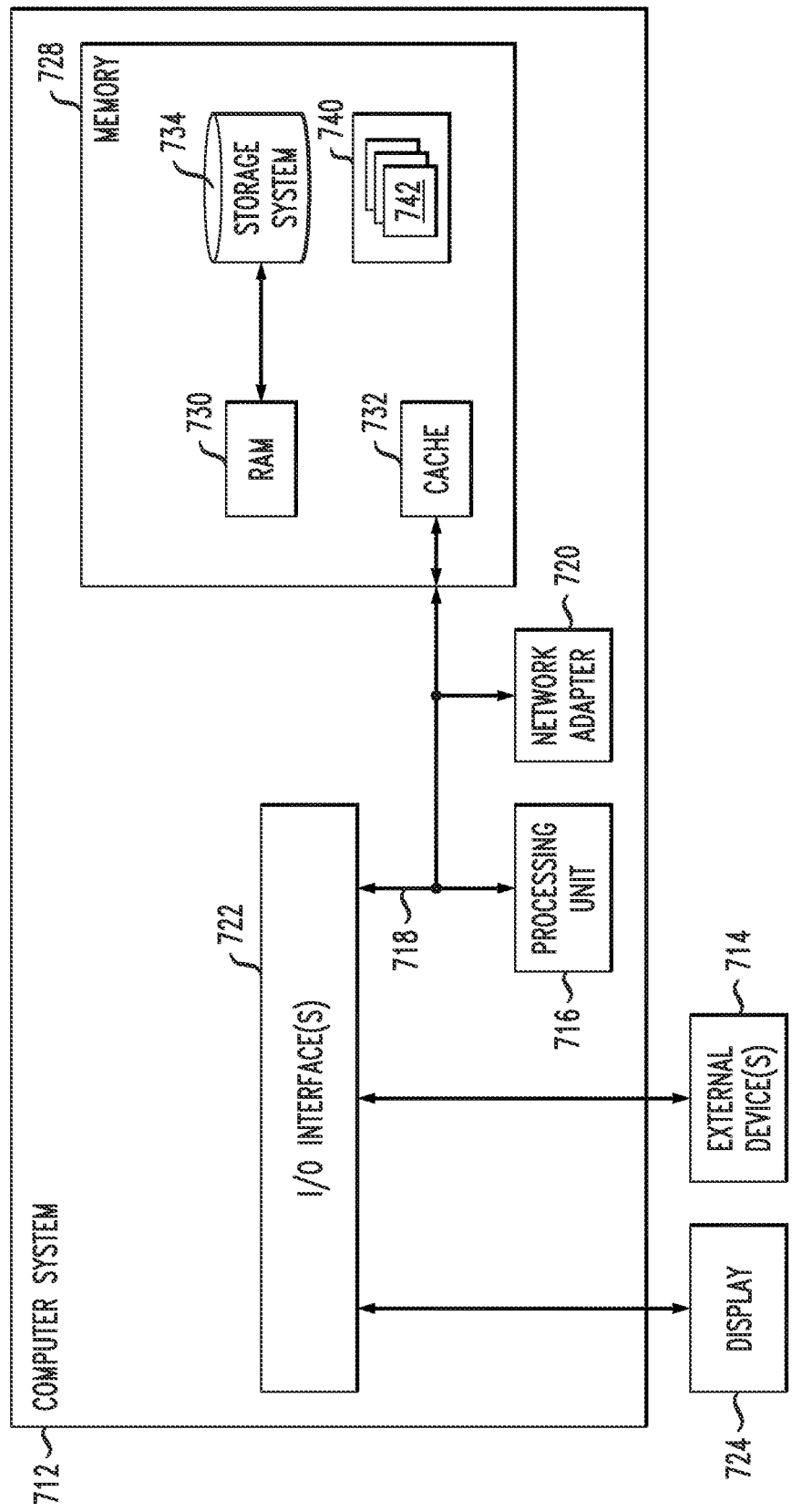
FIG. 7 illustrates a computer system in accordance with which one or more components/steps or techniques of the invention may be implemented according to one or more embodiments of the present invention.

One or more embodiments can make use of software running on a general-purpose computer or workstation. With reference to FIG. 7, in a computing node 710 there is a computer system/server 712, which is operational with numerous other general purposes or special purpose computing system environments or configurations. Examples of well-known computing systems, environments, and/or configurations that may be suitable for use with computer system/server 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, mobile and wearable devices, and distributed cloud computing environments that include any of the above systems or devices, and the like.

Computer system/server 712 may be described in the general context of computer system executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 712 in computing node 710 is shown in the form of a general-purpose computing device. The components of computer system/server 712 may include, but are not limited to, one or more processors or processing units 716, a system memory 728, and a bus 718 that couples various system components including system memory 728 to processor 716.

The bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnects (PCI) bus.

The computer system/server 712 typically includes a variety of computer system readable media. Such media may be any available media that is accessible by computer system/server 712, and it includes both volatile and non-volatile media, removable and non-removable media.

The system memory 728 can include computer system readable media in the form of volatile memory, such as random-access memory (RAM) 730 and/or cache memory 732. The computer system/server 712 may further include other removable/non-removable, volatile/nonvolatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 718 by one or more data media interfaces. As depicted and described herein, the memory 728 may include at least one program product having a set (e.g., at least one) of program modules that are configured to carry out the functions of embodiments of the invention. A program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc., one or more devices that enable a user to interact with computer system/server 712, and/or any devices (e.g., network card, modem, etc.) that enable computer system/server 712 to communicate with one or more other computing devices. Such communication can occur via I/O interfaces 722. Still yet, computer system/server 712 can communicate with one or more networks such as a LAN, a general WAN, and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using program code languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
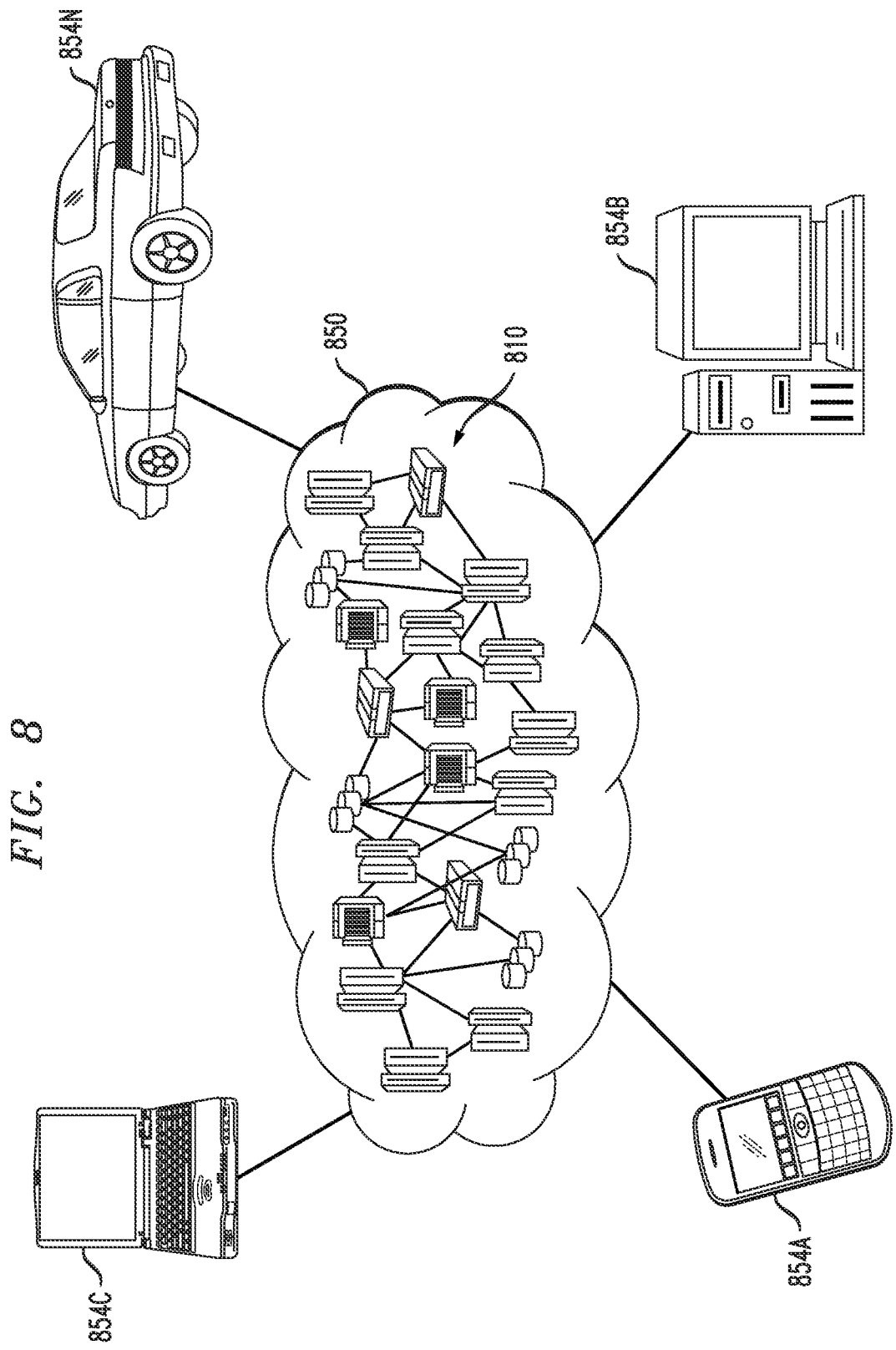
FIG. 8 illustrates a cloud computing environment according to one or more embodiments of the present invention.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
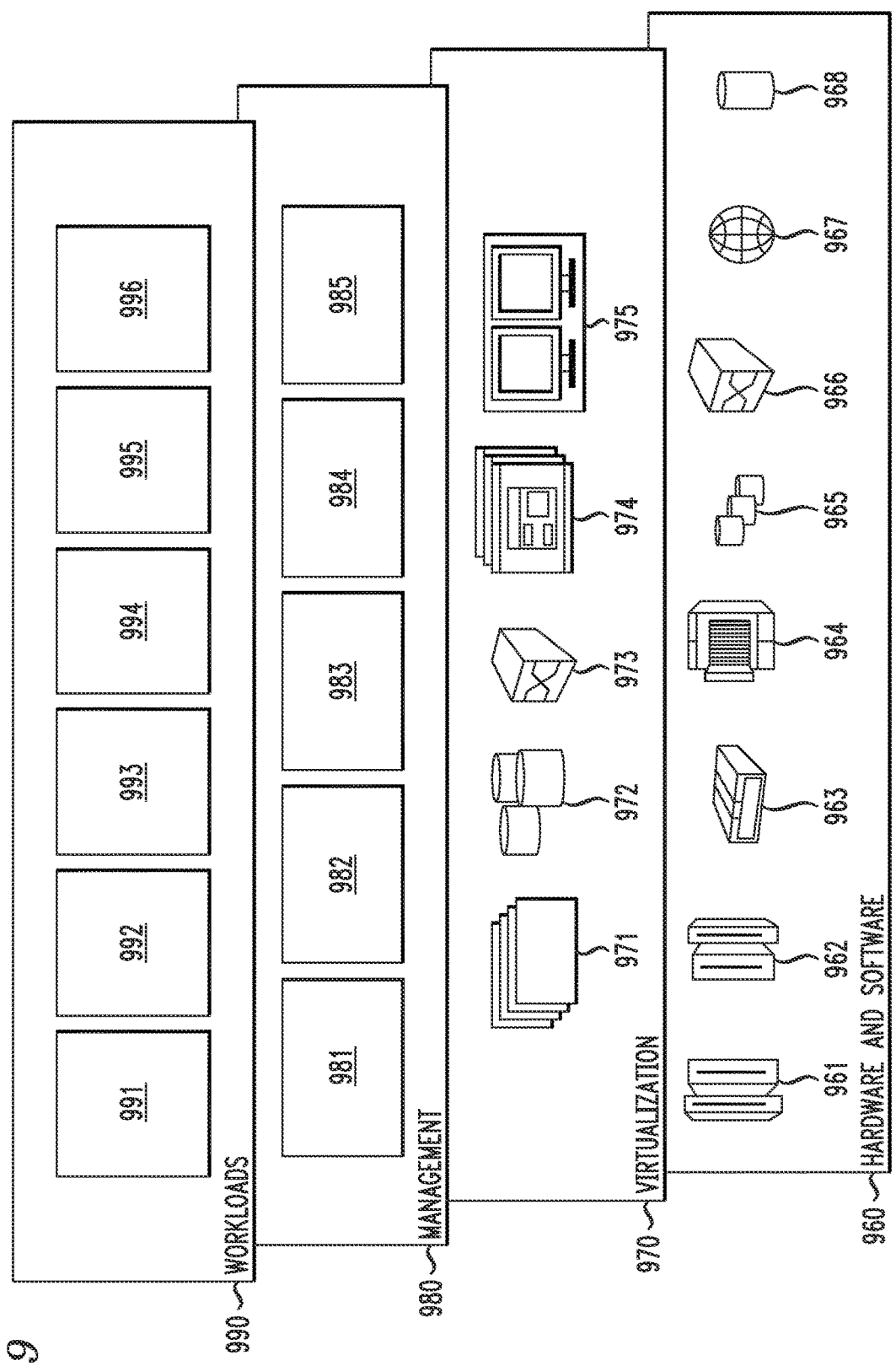
FIG. 9 illustrates abstraction model layers according to one or more embodiments of the present invention.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 include hardware and software components. Examples of hardware components include: mainframes 961; RISC (Reduced Instruction Set Computer) architecture-based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from the workload layer 990 include data analytics processing 991, monitoring conditions at the enterprise 992, collecting historical data of the enterprise 993, identifying incidents in accordance with the implemented policy 994, determining a location of a representative of the enterprise 995 and contacting the representative and/or initiating a remedial response responsive to the incident in accordance with the implemented policy 996 using the methodologies and techniques described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
monitoring, utilizing sensors positioned about premises of an enterprise and operatively coupled to an enterprise monitoring system via one or more communication networks, one or more physical or environmental conditions associated with the premises;
analyzing data input received from the sensors of the one or more conditions;
determining, based on analytics performed on the data input and an implemented policy, whether the one or more conditions qualifies as an incident; and
automatically implementing one or more remedial responses responsive to the incident, including:
remotely controlling operation of equipment associated with the enterprise;
obtaining through one or more global positioning systems couple to the enterprise monitoring system a physical location of a representative of the enterprise; and
determining whether or not to notify a representative of the enterprise based on the location of the representative relative to the enterprise as determined by one or more global positioning systems;

wherein the steps are performed by at least one processing device comprising a processor operatively coupled to a memory.

2. The method of claim 1 including obtaining historical data associated with the one or more conditions, and utilizing the historical data at least in part to calculate a predefined threshold of the one or more conditions.

3. The method of claim 2 wherein determining includes comparing the one or more conditions against the predefined threshold to identify the one or more conditions as the incident.

4. The method of claim 2 further comprising automatically activating one or more additional sensors when the one or more conditions is less than the predefined threshold.

5. The method of claim 1 wherein automatically implementing one or more remedial responses includes contacting one of contacting emergency service personnel, a utility company, and a professional contractor.

6. The method of claim 1 wherein remotely controlling operation of equipment includes at least one of operating a water supply valve, a sprinkler system, a fuel source valve, an alarm system, a video system, a drone, and a sensor.

7. The method of claim 1 wherein notifying the representative of the enterprise includes determining the location of the representative via the geographical positioning system (GPS) associated with an Internet of Things (JOT) device.

8. The method of claim 7 wherein automatically implementing one or more remedial responses includes notifying the representative when the location of the representative is less than a predefined distance from the location of the enterprise.

9. The method of claim 7 wherein automatically implementing one or more remedial responses includes implementing an emergency service protocol when a location of the representative is greater than a predefined distance from a location of the enterprise.

10. The method of claim 1 wherein automatically implementing one or more remedial responses is based at least in part on a determination of a potential expense associated with the incident.

11. The method of claim 1 further comprising automatically initiating a settlement action with contractor personnel in the event services are required to address the incident.

12. A system, comprising:
a memory;
at least one processor coupled to the memory and configured to:
monitor, utilizing sensors positioned about premises of an enterprise and operatively coupled to an enterprise monitoring system via one or more communication networks, one or more physical or environmental conditions associated with the premises;
analyze data input received from the sensors of the one or more conditions;
determine, based on analytics performed on the data input and an implemented policy, whether the one or more conditions qualifies as an incident; and
automatically implement one or more remedial responses responsive to the incident, including:
remotely controlling operation of equipment associated with the enterprise;
obtaining through one or more global positioning systems coupled to the enterprise monitoring system a physical location of a representative of the enterprise; and
determining whether or not to notify a representative of the enterprise based on the location of the representative relative to the enterprise as determined by one or more global positioning systems.

13. The system of claim 12 wherein the processor is further configured to obtain historical data associated with the one or more conditions, and utilize the historical data at least in part to calculate a predefined threshold of the one or more activities.

14. The system of claim 13 wherein the processor is further configured to compare the one or more conditions against the predefined threshold to identify the one or more conditions as the incident.

15. The system of claim 12 wherein the remedial response includes one of contacting emergency service personnel, a utility company and a professional contractor.

16. The system of claim 12 wherein the remedial response includes at least one of automatically notifying a representative of the enterprise.

17. The system of claim 16 wherein the processor is further configured to notify the representative of the enterprise of the incident based the location of the representative being determined via a geographical positioning system (GPS) associated with an Internet of Things (IOT) device.

18. The system of claim 12 further comprising automatically initiating a settlement action with contractor personnel in the event services are required to address the incident.

19. A computer program product comprising:
a non-transitory computer readable medium encoded with computer executable code, the code configured to:
monitor, utilizing sensors positioned about premises of an enterprise and operatively coupled to an enterprise monitoring system via one or more communication networks, one or more physical or environmental conditions associated with the premises;
analyze data input received from the sensors, of the one or more conditions;
determine, based on analytics performed on the data input and an implemented policy, whether the one or more conditions qualifies as an incident; and
automatically implement one or more remedial responses responsive to the incident, including:
remotely controlling operation of equipment associated with the enterprise;
obtaining through one or more global positioning systems coupled to the enterprise monitoring system a physical location of a representative of the enterprise; and
determining whether or not to notify a representative of the enterprise based on the location of the representative relative to the enterprise as determined by one or more global positioning systems.

20. The computer program product of claim 19 further comprising automatically initiating a settlement action with contractor personnel in the event services are required to address the incident.

* * * * *